US012761402B2

(12) United States Patent
Guo et al.

(10) Patent No.: US 12,761,402 B2
(45) Date of Patent: Oct. 13, 2026

(54) MICROLENS ARRAY SUBSTRATE AND PREPARATION METHOD THEREFOR, AND DISPLAY DEVICE

(71) Applicant: BOE Technology Group Co., Ltd., Beijing (CN)

(72) Inventors: Kang Guo, Beijing (CN); Duohui Li, Beijing (CN); Mengya Song, Beijing (CN); Shi Shu, Beijing (CN); Feng Zhang, Beijing (CN); Renquan Gu, Beijing (CN); Xin Gu, Beijing (CN); Guangcai Yuan, Beijing (CN); Xue Dong, Beijing (CN); Jing Yu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 259 days.

(21) Appl. No.: 18/695,820

(22) PCT Filed: Jul. 6, 2023

(86) PCT No.: PCT/CN2023/106154

§ 371 (c)(1),
(2) Date: Mar. 27, 2024

(87) PCT Pub. No.: WO2024/022078

PCT Pub. Date: Feb. 1, 2024

(65) Prior Publication Data

US 2024/0402397 A1 Dec. 5, 2024

(30) Foreign Application Priority Data

Jul. 26, 2022 (CN) ........................ 202210885728.1

(51) Int. Cl.
*G02B 3/00* (2006.01)
*G02B 5/00* (2006.01)

(52) U.S. Cl.
CPC .......... *G02B 3/005* (2013.01); *G02B 3/0018* (2013.01); *G02B 3/0031* (2013.01); *G02B 5/003* (2013.01)

(58) Field of Classification Search
CPC ...... G02B 3/0037; G02B 3/0031; G02B 3/00; G02B 3/005; G02B 3/0056; G02F 1/133526
See application file for complete search history.

(56) References Cited

U.S. PATENT DOCUMENTS

2009/0146237 A1 6/2009 Yun
2014/0160395 A1* 6/2014 Park ................ G02F 1/133377 349/139

(Continued)

FOREIGN PATENT DOCUMENTS

CN 104253238 A 12/2014
CN 110446950 A 11/2019

(Continued)

OTHER PUBLICATIONS

Liu, the English translation for CN-111353480-A (Year: 2020).*

(Continued)

*Primary Examiner* — Jonathan Y Jung

(57) ABSTRACT

A microlens array substrate (200) and a preparation method therefor, and a display device. The microlens array substrate (200) comprises: a base; a microlens film layer disposed on a side of the base and comprising at least one microlens array, the microlens array comprises a plurality of microlenses and a spacer portion between adjacent microlenses; a barrier layer disposed on a side of the microlens film layer (Continued)

away from the base, an orthographic projection of at least part of the barrier layer on the base is overlapped with an orthographic projection of the microlenses on the base; a light shielding layer disposed on a side of the microlens film layer away from the base and comprising at least one light shielding pattern, an orthographic projection of the at least one light shielding pattern on the base is overlapped with an orthographic projection of the spacer portion on the base.

19 Claims, 5 Drawing Sheets

(56) References Cited

U.S. PATENT DOCUMENTS

| | | | | |
|---|---|---|---|---|
| 2015/0001470 | A1* | 1/2015 | Ma | G02B 1/14 257/40 |
| 2015/0181202 | A1* | 6/2015 | Niu | H04N 13/305 348/54 |
| 2019/0181384 | A1 | 6/2019 | Forrest et al. | |
| 2021/0005583 | A1* | 1/2021 | Iguchi | H10W 90/00 |
| 2021/0327941 | A1* | 10/2021 | Lee | H10F 39/8057 |
| 2023/0307584 | A1* | 9/2023 | Tonkikh | H10H 29/142 |

FOREIGN PATENT DOCUMENTS

| | | | | | |
|---|---|---|---|---|---|
| CN | 111353480 | A | * | 6/2020 | G06V 40/1324 |
| CN | 112382648 | A | | 2/2021 | |
| CN | 113219562 | A | | 8/2021 | |
| CN | 114545648 | A | | 5/2022 | |
| CN | 114578463 | A | | 6/2022 | |
| CN | 114609704 | A | | 6/2022 | |
| CN | 114913558 | A | * | 8/2022 | G02B 3/0031 |
| CN | 115185025 | A | | 10/2022 | |
| JP | H08201795 | A | | 8/1996 | |
| JP | 2010271465 | A | | 12/2010 | |
| JP | 2014102268 | A | | 6/2014 | |
| JP | 2015049468 | A | | 3/2015 | |
| JP | 2016001210 | A | | 1/2016 | |

OTHER PUBLICATIONS

Shao, the English translation for CN-114913558-A (Year: 2022).*

International Search Report for PCT/CN2023/106154 Mailed Oct. 11, 2023.

Office Action dated Apr. 26, 2023 for Chinese Patent Application No. 202210885728.1 and English Translation.

* cited by examiner

MICROLENS ARRAY SUBSTRATE AND PREPARATION METHOD THEREFOR, AND DISPLAY DEVICE

CROSS-REFERENCE TO RELATED APPLICATION

The present application is a U.S. National Phase Entry of International Application No. PCT/CN2023/106154 having an international filing date of Jul. 6, 2023, which claims priority from Chinese Patent Application No. 202210885728.1, filed to the CNIPA on Jul. 26, 2022. Contents of the above-identified applications are incorporated into the present application by reference.

TECHNICAL FIELD

The present disclosure relates to, but is not limited to, the field of display technologies, and particularly, relates to a microlens array substrate and a preparation method therefor, and a display device.

BACKGROUND

In display technologies such as naked-eye 3D, AR/VR or light field, it is necessary to use a microlens array to realize the display of 3D pictures or virtual display pictures. At present, the microlens array mainly uses a single-point diamond to fabricate microlens (MLA) templates, and then uses a nanoimprinting technology to fabricate microlens substrates. However, the scheme of using the single-point diamond for MLA templates has some problems, such as high cost and difficulty in large size. Moreover, it is difficult to fabricate a close-bonded lens array by means of a photolithographic thermal reflow, whether it is directly forming a microlens array or forming a microlens array by nanoimprinting based on it as an imprint template, and light can be emitted from a gap between adjacent microlenses, resulting in crosstalk and other disadvantages.

The above problems can be solved by adding a light shielding pattern (such as a black matrix) between adjacent microlenses to achieve the effect of a close-bonded lens array, and the light shielding pattern can prevent light from being emitted from the gap between adjacent microlenses. However, in the process of forming the light shielding pattern, the alignment accuracy of the light shielding pattern and the gap between the adjacent microlenses is poor, and it is difficult to accurately form the light shielding pattern at the gap between the adjacent microlenses.

SUMMARY

The following is a summary of subject matter described herein in detail. This summary is not intended to limit the protection scope of the claims.

In a first aspect, an embodiment of the present disclosure provides a microlens array substrate, including: a base; a microlens film layer disposed on a side of the base and including at least one microlens array, the microlens array including a plurality of microlenses and a spacer portion between adjacent microlenses; a barrier layer disposed on a side of the microlens film layer away from the base, an orthographic projection of at least part of the barrier layer on the base being overlapped with an orthographic projection of the microlenses on the base; and a light shielding layer disposed on a side of the microlens film layer away from the base and including at least one light shielding pattern, an orthographic projection of the at least one light shielding pattern on the base being overlapped with an orthographic projection of the spacer portion on the base.

In an exemplary implementation mode, the orthographic projection of the light shielding pattern on the base is completely overlapped with the orthographic projection of the spacer portion on the base.

In an exemplary implementation mode, the orthographic projection of the spacer portion on the base is positioned in the orthographic projection of the light shielding pattern on the base, and an area of the orthographic projection of the spacer portion on the base is smaller than an area of the orthographic projection of the light shielding pattern on the base.

In an exemplary implementation mode, the barrier layer includes a first portion, an orthographic projection of the first portion on the base is overlapped with an orthographic projection of the microlenses on the base, an orthographic projection of at least part of the light shielding pattern on the base is overlapped with an orthographic projection of the microlenses on the base, and at least part of the light shielding pattern is disposed on a side of the first portion away from the base and in contact with the first portion.

In an exemplary implementation mode, the barrier layer further includes a second portion, an orthographic projection of the second portion on the base is overlapped with the orthographic projection of the spacer portion on the base, and at least part of the light shielding pattern is disposed on a side of the second portion away from the base and in contact with the second portion.

In an exemplary implementation mode, the first portion and the second portion are integrally formed.

In an exemplary implementation mode, the microlens film layer further includes a first alignment mark, and an orthographic projection of the first alignment mark on the base is not overlapped with the orthographic projection of the microlenses on the base. The base includes a second alignment mark, and the orthographic projection of at least part of the first alignment mark on the base is overlapped with the second alignment mark.

In an exemplary implementation mode, a planarization layer is also included, which is disposed on a side of the barrier layer and the light shielding layer away from the base. A refractive index of the planarization layer is lower than that of the microlenses.

In an exemplary implementation mode, the difference between the refractive index of the microlenses and the refractive index of the planarization layer is not less than 0.1.

In an exemplary implementation mode, a microlens is in a strip shape. The microlens extends along a first direction, and the plurality of microlenses are arranged along a second direction, a length of the microlenses in the second direction being from 10 microns to 300 microns; and/or, an arch height of the microlens is from 5 microns to 30 microns; and/or, a length of the spacer portion in the second direction is from 1.5 microns to 5 microns.

In an exemplary implementation mode, the barrier layer is made of an inorganic light-transmitting material.

In an exemplary implementation mode, the barrier layer has a thickness of 10 nm to 100 nm.

In an exemplary implementation mode, a maximum thickness of the light shielding pattern is from 1 micron to 5 microns.

In a second aspect, an embodiment of the present disclosure also provides a display device including the microlens array substrate described in any one of above implementation modes.

In a third aspect, an embodiment of the present disclosure also provides a preparation method for a microlens array substrate, including:

forming a microlens film layer on a base, the microlens film layer including a plurality of microlenses and a spacer portion between adjacent microlenses;

forming a barrier layer on a side of the microlens film layer away from the base, an orthographic projection of at least part of the barrier layer on the base being overlapped with an orthographic projection of the microlenses on the base; and forming a light shielding film on a side of the barrier layer away from the base, and performing a patterning process on the light shielding film, so that the light shielding film forms at least one light shielding pattern, an orthographic projection of the at least one light shielding pattern on the base being overlapped with an orthographic projection of the spacer portion on the base.

Other aspects may become clear after the accompanying drawings and the detailed description are read and understood.

BRIEF DESCRIPTION OF DRAWINGS

Accompanying drawings are used for providing an understanding of technical solutions of the present application and form a part of the specification, are used for explaining the technical solutions of the present application together with embodiments of the present application, and do not constitute a limitation on the technical solutions of the present application.

Figure 1:
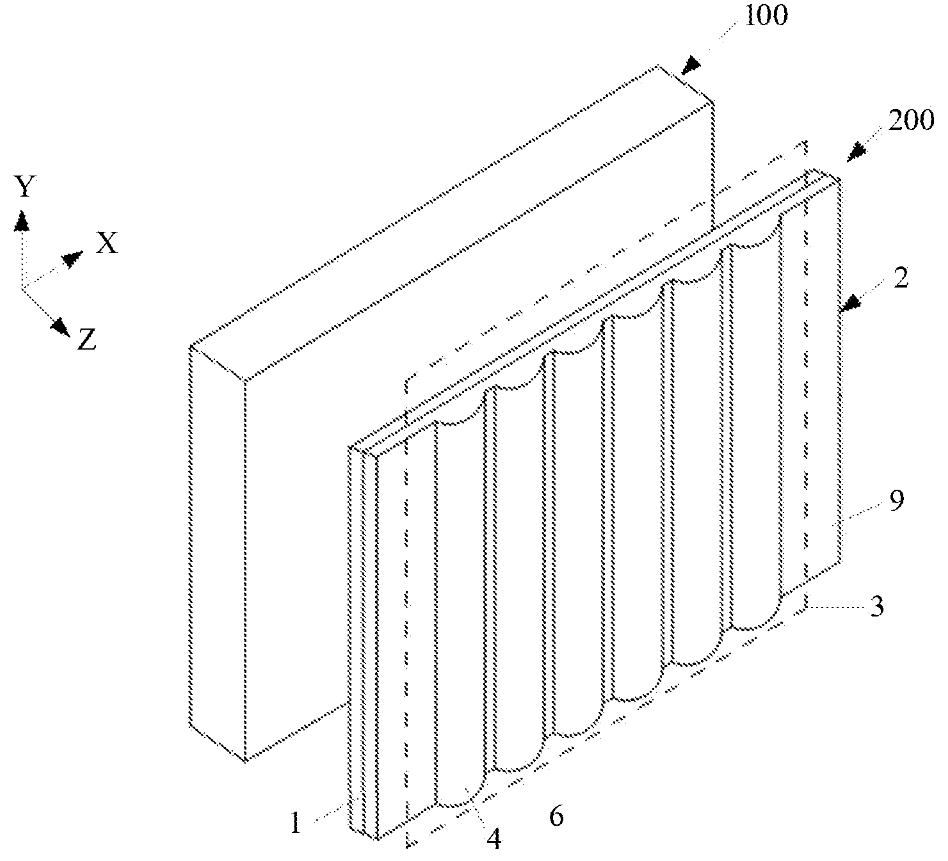
FIG. 1 is a schematic diagram of a structure of a display device according to an embodiment of the present disclosure.

Reference signs are described as follows.

100—display panel;

101—200—microlens array substrate, 1—base, 11—second alignment mark, 2—microlens film layer, 3—microlens array, 4—microlens, 5—barrier layer, 51—second portion, 52—first portion, 6—light shielding pattern, 6'—light shielding film, 7—spacer portion, 8—planarization layer, 9—peripheral portion, 91—first alignment mark;

300—adhesive layer.

DETAILED DESCRIPTION

To make the objectives, technical solutions, and advantages of the present disclosure clearer, embodiments of the present disclosure will be described in detail below with reference to the drawings. It is to be noted that implementation modes may be implemented in various forms. Those of ordinary skills in the art can easily understand such a fact that implementation modes and contents may be transformed into various forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflict.

In the drawings, a size of each composition element, a thickness of a layer, or a region may be exaggerated sometimes for clarity. Therefore, an implementation of the present disclosure is not always limited to the size, and the shape and size of each component in the drawings do not reflect an actual scale. In addition, the drawings schematically illustrate ideal examples, and an implementation of the present disclosure is not limited to shapes, numerical values, or the like shown in the drawings.

Ordinal numerals "first", "second", "third" and the like in the specification are set not to form limits in numbers but only to avoid confusion between composition elements.

In the specification, for convenience, expressions "central", "above", "below", "front", "back", "vertical", "horizontal", "top", "bottom", "inside", "outside" and the like for indicating directional or positional relationships are used to illustrate positional relationships between the composition elements with reference to the drawings, which are only for the convenience of describing the specification and simplifying the description, and do not indicate or imply that involved devices or elements are required to have specific orientations, are structured and operated in the specific orientations, and thus should not be understood as limitations on the present disclosure. The positional relationships between the composition elements may be changed as appropriate according to a direction in which each composition element is described. Therefore, appropriate replacements based on situations are allowed, the positional relationships are not limited to the expressions in the specification.

In the specification, unless otherwise expressly specified and defined, terms "mounting", "connection", and "join"

should be understood in a broad sense. For example, it may be a fixed connection, or a detachable connection, or an integral connection; it may be a mechanical connection or an electrical connection; it may be a direct connection, or an indirect connection through an intermediate, or an internal communication between two elements. Those of ordinary skills in the art can understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that in the specification, the channel region refers to a region through which a current mainly flows.

In the specification, a first electrode may be a drain electrode, and a second electrode may be a source electrode. Alternatively, the first electrode may be a source electrode, and the second electrode may be a drain electrode. In cases that transistors with opposite polarities are used, or a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes connection of composition elements through an element with a certain electrical action. "An element with a certain electrical action" is not particularly limited as long as electric signals may be sent and received between the connected composition elements. Examples of the "element with a certain electrical action" not only include an electrode and a wiring, but also include a switch element such as a transistor, a resistor, an inductor, a capacitor, another element with various functions, etc.

In the specification, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" means that a boundary is not defined so strictly and numerical values within a range of process and measurement errors are allowed.

According to the research of the inventor of the present disclosure, it is found that a preparation method of the microlens array substrate of the related technology includes: making alignment marks on a base, and making a patterned light shielding pattern based on the formed alignment mark. Microlenses are continuously fabricated on the base after the light shielding pattern is formed. There are two commonly used processes for fabricating microlenses, one is Nanoimprinting Technology, and the other is photoresist thermal reflow technology.

In the process of fabricating microlenses by nanoimprinting technology, a conventional positioning manner is a bottom-up manner, and a microlens film layer and a light shielding pattern made in the previous sequence are stacked and aligned by an alignment device of imprint equipment. However, due to the poor alignment accuracy of the alignment device, the deviation between the microlenses and the light shielding pattern is relatively large. In a process of fabricating microlenses by photoresist thermal reflow technology, it is necessary to fabricate a light shielding pattern by a photolithography process first, and then continue to fabricate microlenses on a base where the light shielding pattern is formed in the previous sequence. The main technological processes include exposing the photoresist on the base under the shielding of a mask, the exposed patterns being round, rectangular or regular hexagon, developing the exposed photoresist and cleaning the residual substances, placing it on a heating platform, and hot melt molding it. There is a problem that the width of the light shielding pattern is relatively large in the fabrication of microlenses by photoresist thermal reflow technology, which is generally greater than 3 microns (μm), leading to the decrease of the molding rate of microlenses and the display effect of the display device. It can be seen that the processes of fabricating microlenses by nanoimprinting technology and photoresist thermal reflow technology each involve the alignment operation between a microlens film layer and a light shielding pattern, which increases the complexity of the overall fabrication process of a microlens array substrate, and has problems such as low alignment accuracy and decreased light output.

Figure 2:
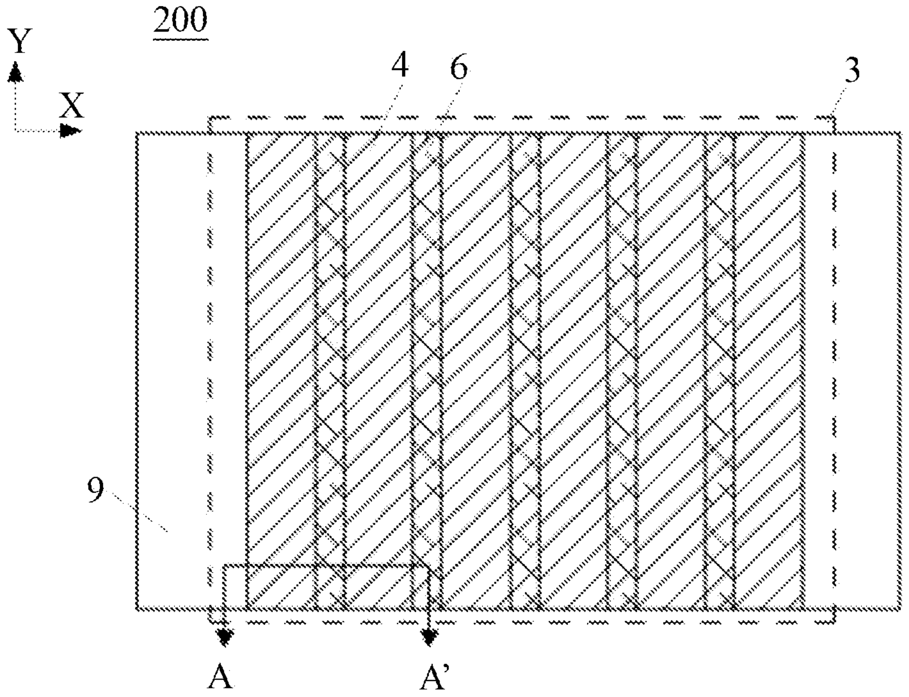
FIG. 2 is a schematic diagram of a structure of a microlens array substrate according to an embodiment of the present disclosure.
Figure 3:
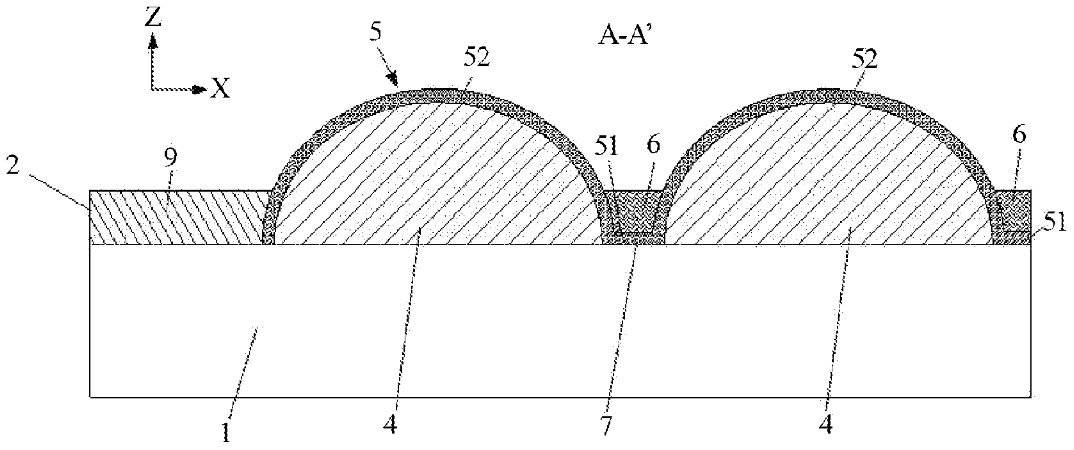
FIG. 3 is a first cross-sectional view of a microlens array substrate according to an embodiment of the present disclosure.

FIG. 1 is a schematic diagram of a structure of a display device according to an embodiment of the present disclosure. FIG. 2 is a schematic diagram of a structure of a microlens array substrate according to an embodiment of the present disclosure. FIG. 3 is a first cross-sectional view of a microlens array substrate according to an embodiment of the present disclosure. FIG. 3 is a cross-sectional view taken along A-A' direction in FIG. 2. As shown in FIGS. 1, 2 and 3, three directions are defined for the elaboration of the technical solutions, a first direction is identified as Y, a second direction is identified as X, and a third direction is identified as Z. The first direction, the second direction, and the third direction are all different. For example, the first direction, the second direction, and the third direction are pairwise perpendicular to each other. An embodiment of the present disclosure provides a display device, which includes a display panel 100 and a microlens array substrate 200 disposed oppositely, and the microlens array substrate 200 is positioned on a light emitting side of the display panel 100.

In an exemplary implementation mode, the display panel 100 may be any one of an organic light emitting diode (OLED) display panel, a quantum dot light emitting diodes (QLED) display panel, and a miniLED or microLED display panel or other self-luminous display panels, and may also be a liquid crystal display (LCD) panel.

In an exemplary implementation mode, the display panel may include a display region, a bonding region on at least one side of the display region, and a bezel region on the other sides of the display region.

In an exemplary implementation mode, the display region of the display panel includes multiple sub-pixels that constitute a pixel array. The multiple sub-pixels are configured to display a dynamic picture or a static image, and the display region may be referred to as an active area (AA). The display region of the display panel may include multiple pixel units arranged in a matrix manner. For example, at least one pixel unit may include a first sub-pixel emitting first-color light, a second sub-pixel emitting second-color light, and a third sub-pixel and a fourth sub-pixel emitting third-color light. Each sub-pixel may include a pixel circuit and a light emitting element. The pixel circuit is electrically connected to a scan signal line, a data signal line, and a light emitting control line respectively. The pixel circuit may be configured to receive a data voltage transmitted by the data signal line under control of the scan signal line and the light emitting control line, and output a corresponding current to the light emitting element. The light emitting element in each sub-pixel is connected to a pixel circuit of a sub-pixel where the light emitting element is located, and is configured to emit light with a corresponding brightness in response to a current output by the pixel circuit of the sub-pixel where the light emitting element is located.

In an exemplary implementation mode, the first sub-pixel may be a red sub-pixel (R) emitting red light, the second sub-pixel may be a blue sub-pixel (B) emitting blue light, and the third sub-pixel and the fourth sub-pixel may be green sub-pixels (G) emitting green light. In some examples, a shape of a light emitting element of a sub-pixel may be rectangular, rhombic, pentagonal or hexagonal. The light emitting elements of the four sub-pixels may be arranged in a diamond-shaped manner to form an RGBG pixel arrangement. In other exemplary embodiments, the light emitting elements of the four sub-pixels may be arranged side by side horizontally, side by side vertically, or in a square-shaped manner or the like, which is not limited in the present disclosure. In some other exemplary embodiments, the pixel unit may include three sub-pixels, the light emitting elements of the three sub-pixels may be arranged side by side horizontally, side by side vertically, or in a 品 manner or the like, which is not limited in the present disclosure. A microlens 4 may be used to enhance light emitted by a light emitting element of a sub-pixel, i.e. the microlens 4 and a sub-pixel are disposed in groups along a direction of the thickness of the microlens array substrate. Alternatively, a microlens 4 is used to enhance the light emitted by light emitting elements of more than two sub-pixels.

In an exemplary implementation mode, in a direction perpendicular to a display panel 100, the display panel 100 may include a base substrate, and a drive circuit layer, a light emitting structure layer, and an encapsulation structure layer which are sequentially disposed on the base substrate. In some possible implementation modes, the display panel may include another film layer, such as a touch structure layer, which is not limited in the present disclosure.

In an exemplary implementation mode, as shown in FIGS. 2 and 3, an embodiment of the present disclosure provides a microlens array substrate 200. The microlens array substrate 200 can be used in the above-mentioned display device. The microlens array substrate 200 includes a base 1, a microlens film layer 2 disposed on a side of the base 1, a barrier layer 5 disposed on a side of the microlens film layer 2 away from the base 1, and a light shielding layer disposed on a side of the barrier layer 5 away from the base 1, the light shielding layer including at least one light shielding pattern 6. The microlens film layer 2 includes at least one microlens array 3 which may be a close-bonded microlens array or a non-close-bonded microlens array. Taking setting a non-close-bonded microlens array 3 as an example, a technical solution is expounded.

In an exemplary implementation mode, as shown in FIGS. 1, 2 and 3, the microlens array 3 includes a plurality of microlenses 4 and a spacer portion 7 positioned between adjacent microlenses 4. An orthographic projection of at least part of the barrier layer 5 on the base 1 is overlapped with an orthographic projection of the microlenses 4 on the base 1. An orthographic projection of at least part of the light shielding pattern 6 on the base 1 is overlapped with an orthographic projection of the spacer portion 7 on the base 1.

In an exemplary implementation mode, as shown in FIG. 3, a distance between a surface of the spacer portion 7 facing away from the base 1 and a surface of the base 1 close to the microlens film layer 2 is not greater than the minimum distance between a surface of a microlens 4 facing away from the base 1 and a surface of the base 1 close to the microlens film layer 2, so that two adjacent microlenses 4 and the spacer portion 7 between the two adjacent microlenses 4 are combined to form a groove. The light shielding pattern 6 is positioned in the groove.

In an exemplary implementation mode, as shown in FIG. 3, an orthographic projection of the barrier layer 5 on the base 1 is overlapped with an orthographic projection of each microlens 4 on the base 1, and an orthographic projection of the barrier layer 5 on the base 1 is overlapped with an orthographic projection of each spacer portion 7 on the base 1, i.e. the barrier layer 5 may cover the entire microlens array 3. The light shielding pattern 6 is disposed on a side of the barrier layer 5 away from the base 1 and comes into contact with the barrier layer 5.

In some embodiments, an orthographic projection of the barrier layer on the base may be each overlapped with an orthographic projection of each microlens on the base and not overlapped with an orthographic projection of each spacer portion on the base. The light shielding pattern is disposed on a side of the microlens film layer away from the base, with at least part of the light shielding pattern positioned on and in contact with the spacer portion.

Figure 7:
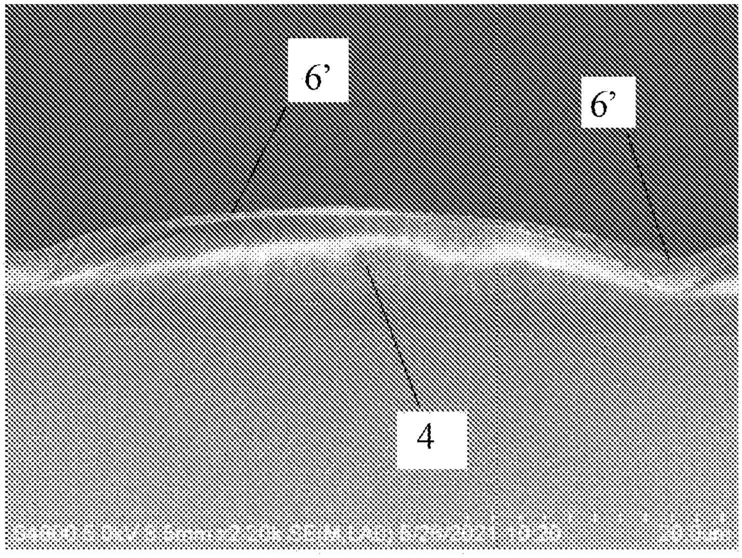
FIG. 7 is a scanning electron micrograph of the microlens array substrate according to an embodiment of the present disclosure after fabricating a light shielding film during the fabrication process.
Figure 8:
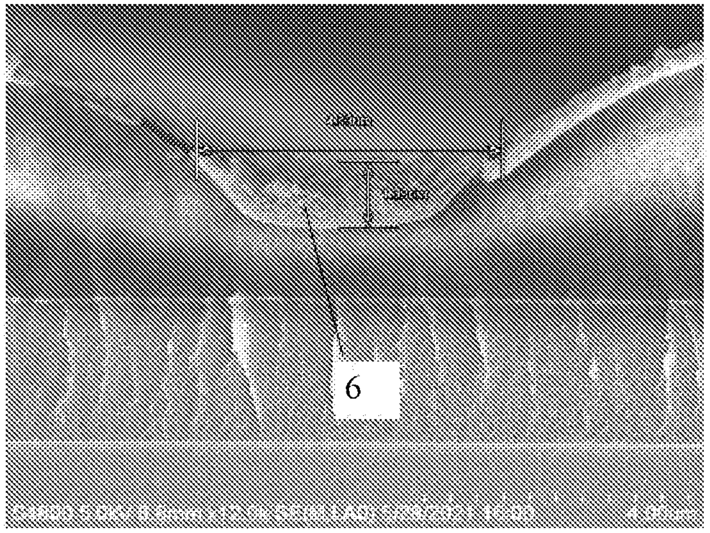
FIG. 8 is a scanning electron micrograph of a microlens array substrate according to the embodiment of the present disclosure after forming a light shielding pattern during the manufacturing process.

FIG. 7 is a scanning electron micrograph of a microlens array substrate according to an embodiment of the present disclosure after fabricating a light shielding film during the fabrication process. FIG. 8 is a scanning electron micrograph of a microlens array substrate according to an embodiment of the present disclosure after forming a light shielding pattern during the manufacturing process. In the microlens array substrate 200 according to an embodiment of the present disclosure, a barrier layer 5 is provided on a side of the microlens film layer 2 away from the base 1, a light shielding pattern 6 is provided on a side of the barrier layer 5 away from the base 1, and in the process of etching to form the light shielding pattern 6, the barrier layer 5 is used to protect the portion provided with the microlenses 4, so as to avoid over-etching and changing the morphology of the microlenses 4 in the etching process. As shown in FIG. 7, a light shielding film 6' positioned at a gap between two adjacent microlenses 4 is significantly thicker than a light shielding film 6' positioned on a surfaces of the microlenses 4, thus providing a prerequisite for a self-aligned solution. As shown in FIG. 8, the light shielding film 6' is no longer present on the surfaces of the microlenses 4 after etching, and the light shielding film 6' between the two microlenses 4' forms a light shielding pattern 6.

It can be seen that the structure of the microlens array substrate 200 according to an embodiment of the present disclosure enables the light shielding pattern 6 to be formed in a groove surrounded by the two adjacent microlenses 4 and the spacer portion 7. Because the thickness (Z direction) of the light shielding film 6' positioned at a gap between two adjacent microlenses 4 is larger than that of the light shielding film 6' positioned on the surfaces of the microlenses 4, the light shielding film 6' positioned at the gap between two adjacent microlenses 4 is still left to form a light shielding pattern 6 when patterning the light shielding film 6'. The light shielding pattern 6 plays a role in shielding the light between adjacent microlenses 4, so as to avoid the cross-talk between the outgoing light rays of adjacent microlenses 4. The fabrication of the light shielding pattern 6 does not need to add an alignment fixture, and the width (X direction) of the light shielding pattern 6 is not limited by the line width of the traditional lithography, so that the microlens and the light shielding pattern adopt self-alignment technology, which has extremely high alignment accuracy and has the advantages such as simple manufacturing process and high light efficiency. The light shielding pattern 6 is obtained by a patterning process to be formed between two adjacent microlenses 4, so that the light shielding pattern 6 and the spacer portion 7 have a better bonding profile and contact performance, so as to improve the water-oxygen reliability of the microlens array substrate 200.

In an exemplary implementation mode, as shown in FIGS. 1 and 2, a microlens 4 may be disposed in a strip shape extending in a first direction. A plurality of microlenses 4 in a strip shape are arranged at equal intervals or unequal intervals in a second direction. A projection of a microlens array 3 in a third direction may be disposed in a regular or irregular shape such as a rectangle, an ellipse and a polygon.

Figure 4:
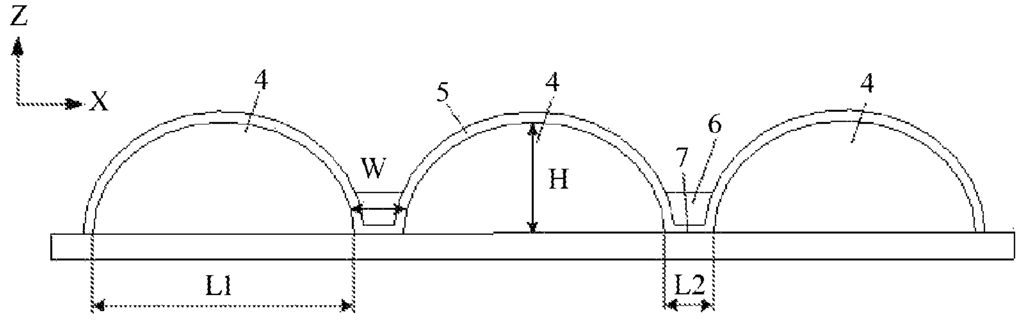
FIG. 4 is a second cross-sectional view of a microlens array substrate according to an embodiment of the present disclosure.

FIG. 4 is a second cross-sectional view of a microlens array substrate according to an embodiment of the present disclosure. As shown in FIG. 4, in the Z direction, a size W between the profiles of two microlenses 4 varies in the X direction, and a size of a light shielding pattern 6 disposed between the two microlenses 4 in the X direction varies in the Z direction, i.e. a non-constant value, which will affect the area of the orthographic projection of the light shielding pattern 6 on the base 1 in the Z direction.

In an exemplary implementation mode, as shown in FIG. 4, a length L1 of a microlens 4 in a first direction (X direction) may be set between 10 microns (μm) and 300 microns (μm). An arch height H of a microlens 4, i.e. the size in the third direction (Z direction), may be set between 5 microns (μm) and 30 microns (μm). A length L2 of the spacer portion 7 in the first direction (X direction) may be set between 1.5 microns (μm) and 5 microns (μm).

In an exemplary implementation mode, the microlens in an embodiment of the present disclosure may be a micro convex lens with a small focal length (e.g. 2-3 mm), which can reduce the thickness and weight of the device.

In an exemplary implementation mode, the aperture of the microlens in an embodiment of the present disclosure is not limited. For example the microlens may reach the micron level.

In an exemplary implementation mode, the microlens in an embodiment of the present disclosure includes at least one of a spherical lens, an aspheric lens, and a free-form lens.

In an exemplary implementation mode, the microlens in an embodiment of the present disclosure may be an aspheric lens, and a curvature radius of the aspheric lens continuously changes from the center to the edge of the curvature, which can maintain good aberration correction to achieve the desired performance. The application of the aspheric lens brings excellent sharpness and higher resolution, and moreover, makes a miniaturization design of the lens possible.

In an exemplary implementation mode, the material of the microlens in an embodiment of the present disclosure may be a light-transmitting material such as glass or transparent plastic.

In an exemplary implementation mode, the base 1 in an embodiment of the present disclosure may be made of a light-transmitting material such as a glass substrate or a transparent plastic substrate or a light transmitting substrate such as a flexible substrate.

In an exemplary implementation mode, the microlens film layer 2 in an embodiment of the present disclosure is generally molded using photoresist fabrication. The molding process of the microlens 4 may be selected from a nanoimprinting technology or a photoresist thermal reflow technology and the like, and the specific molding process is not limited herein.

In an exemplary implementation mode, an orthographic projection of at least part of the light shielding pattern 6 on the base 1 is overlapped with an orthographic projection of the spacer portion 7 on the substrate 1 in an embodiment of the present disclosure. For example, the orthographic projection of the light shielding pattern 6 on the base 1 completely coincides with the orthographic projection of the spacer portion 7 on the base 1. Alternatively, the orthographic projection of the spacer portion 7 on the base 1 is located in the orthographic projection of the light shielding pattern 6 on the base 1, and the area of the orthographic projection of the spacer portion 7 on the base 1 is smaller than the area of the orthographic projection of the light shielding pattern 6 on the base 1. That is, the profile surfaces of the two adjacent microlenses 4 and the spacer portion 7 can constitute an accommodation space for accommodating the light shielding pattern 6, thereby realizing positioning by using structural features and simplifying the fabrication process of the microlens array substrate 200.

In an exemplary implementation mode, the light shielding pattern 6 in an embodiment of the present disclosure may be made of a black polymer and a black matrix film layer having a high light absorbance may be selected to be obtained by a patterning process. For obtaining the black matrix, dry etching can be selected. The maximum thickness of the light shielding pattern 6 in the Z direction may be from 1 micron (μm) to 5 microns (μm).

In an exemplary implementation mode, the barrier layer 5 may be made of an inorganic light-transmitting material, such as one or more of silicon oxynitride (SION), silicon nitride (SIN), silicon oxide (SIO), aluminum oxide ($Al_2O_3$), titanium dioxide ($TiO_2$). The thickness of the barrier layer 5 may be set between 10 nanometer (nm) and 100 nanometer (nm). The barrier layer 5 may be formed by PECVD (Plasma Enhanced Chemical Vapor Deposition), PEALD (Atomic Layer Deposition) or Sputter (Sputtering), which will not be described here.

In an exemplary implementation mode, as shown in FIG. 3, the barrier layer 5 includes a first portion 52 and a second portion 51. The first portion 52 and the second portion 51 may be integrally molded to form a film layer structure, i.e. the first portion 52 and the second portion 51 may be fabricated using the same material by the same fabrication process. An orthographic projection of the first portion 52 on the base 1 is overlapped with an orthographic projection of the microlens 4 on the base 1 for protecting the profile of the microlens 4 from damage to the profile of the microlens 4 caused by the fabrication process resulting in affecting the optical performance of the microlens 4. An orthographic projection of the second portion 51 on the substrate 1 is overlapped with an orthographic projection of the spacer portion 7 on the base 1, and the second portion 51 can completely cover the spacer portion 7 to improve the reliability of the microlens array substrate 200 in blocking water and oxygen.

In some embodiments, the first portion and the second portion may be two film layers independent of each other, i.e. the first portion and the second portion may be prepared using the same or different materials by the same or different preparation processes. The adjacent first portion and second portion can be disposed at intervals or contacted with each other.

Figure 5:
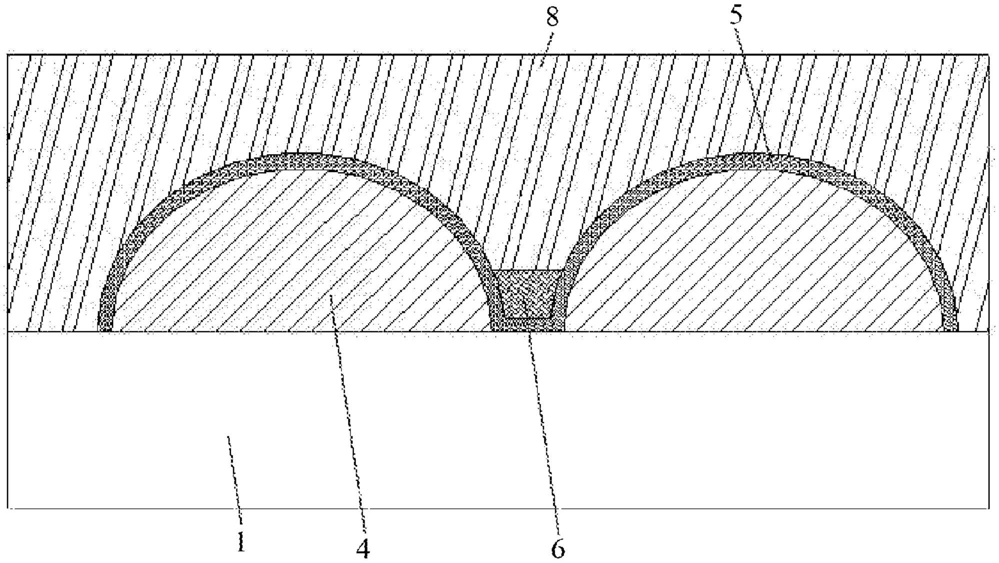
FIG. 5 is a third cross-sectional view of a microlens array substrate according to an embodiment of the present disclosure.

FIG. 5 is a third cross-sectional view of a microlens array substrate according to an embodiment of the present disclosure. As shown in FIG. 5, the microlens array substrate 200 further includes a planarization layer 8. The planarization layer 8 is disposed on a side of the barrier layer 5 and the light shielding layer away from the base 1. At least part of the planarization layer 8 covers the microlens 4 and the light shielding pattern 6. An edge of the planarization layer 8 may be flush with an edge of the microlens array 3 or an orthographic projection of the edge of the planarization layer 8 along the base 1 may cover the edge of the microlens array 3. The planarization layer 8 can planarize the microlens array substrate 200 and can protect the microlens 4 and the light shielding pattern 6 from damage to the microlens 4 and the light shielding pattern 6 caused by subsequent processes, thereby affecting the light output quality of the display device.

In an exemplary implementation mode, a film thickness of the planarization layer 8 in an embodiment of the present disclosure may be set between 5 microns (μm) and 30 microns (μm). The planarization layer 8 may be made of a transparent material for example a transparent adhesive material. For example, the planarization layer 8 may be made of polymers such as acrylate, epoxy or polyurethane. The planarization layer 8 can be formed by ink jet printing, screen printing, flash evaporation, PECVD, etc.

In an exemplary implementation mode, a refractive index of the planarization layer 8 in an embodiment of the present disclosure is set to be lower than a refractive index of the microlens 4, the refractive index range of the planarization layer 8 may be set between 1.3 and 1.6, and the refractive index range of the microlens 4 may be set between 1.5 and 1.8.

In an exemplary implementation mode, the difference between the refractive index of the microlens 4 and the refractive index of the planarization layer 8 in an embodiment of the present disclosure is not less than 0.1 to improve the optical performance of the microlens array substrate 200.

In an exemplary implementation mode, the microlens film layer further includes at least one first alignment mark. An orthographic projection of the first alignment mark on the base is not overlapped with an orthographic projection of the microlens on the base. The base includes at least one second alignment mark. The orthographic projection of at least part of the first alignment mark on the base is overlapped with the second alignment mark. The first alignment mark and the second alignment mark are disposed in groups, and the first alignment mark is used for alignment with the second alignment mark during fabrication of the microlens array substrate 200, to align the microlens film layer onto the base to ensure the accuracy of adjustment of the microlens to the outgoing light.

In an exemplary implementation mode, as shown in FIG. 2, the microlens film layer 2 further includes a peripheral portion 9. The peripheral portion 9 is positioned at the periphery of the microlens array 3, and the peripheral portion 9 and the microlens array 3 can be integrally formed. At least one first alignment mark is positioned on the peripheral portion 9.

Figure 6A:
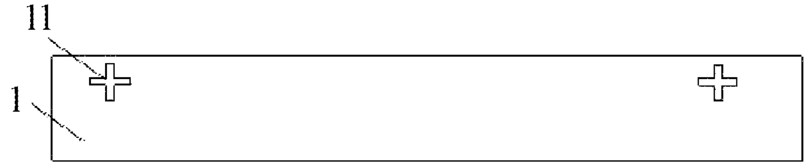
FIG. 6*a* is a schematic diagram of a structure of the microlens array substrate according to an embodiment of the present disclosure after forming a base.

FIGS. 6*a* to 6*f* are flowcharts of fabricating a microlens array substrate according to an embodiment of the present disclosure. As shown in the figures, an embodiment of the disclosure also provides a preparation method for the microlens array substrate. The preparation method may include the following steps:

(1) Forming a base. The base 1 includes at least one second alignment mark 11 for positioning with a subsequently formed microlens film layer 2, as shown in FIG. 6*a*.

(2) Forming a microlens film layer. Forming a microlens film layer includes:

First, fabricating a microlens film on the base 1, and forming the microlens film into a microlens film layer 2 by using a nanoimprinting technology or a photoresist thermal reflow technology. The microlens film layer 2 includes at least one microlens array and at least one first alignment mark 91, and the microlens array includes a plurality of microlenses 4 and a spacer portion 7 positioned between adjacent microlenses 4.

Figure 6B:
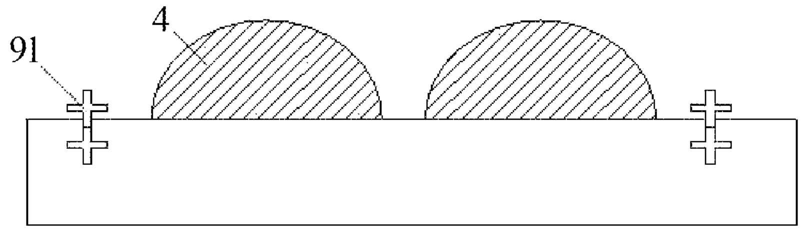
FIG. 6*b* is a schematic diagram of a structure of the microlens array substrate according to an embodiment of the present disclosure after forming a microlens film layer.

Then aligning the first alignment mark 91 with the second alignment mark 11 on the base 1 so that the microlens film layer 2 is attached to the base 1 as shown in FIG. 6*b*.

Figure 6C:
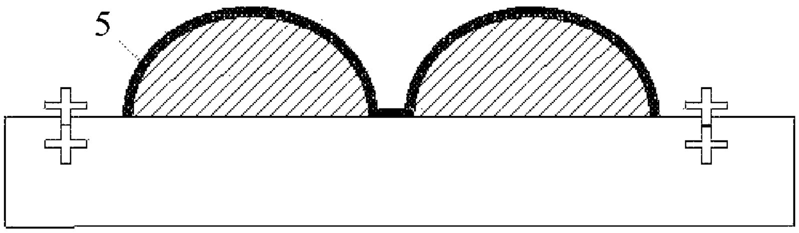
FIG. 6*c* is a schematic diagram of a structure of the microlens array substrate according to an embodiment of the present disclosure after forming a barrier layer.

(3) Forming a barrier layer. Forming the barrier layer includes: on the base 1 forming with the above structure, forming a barrier layer 5 on a side of the microlens film layer 2 away from the base 1. The structure of the barrier layer 5 has been described above and will not be described here. An orthographic projection of at least part of the barrier layer 5 on the base 1 is overlapped with an orthographic projection of the microlenses 4 on the base 1. For example, the barrier layer 5 covers all the microlenses 4 and all the spacer portions 7, as shown in FIG. 6*c*.

Figure 6D:
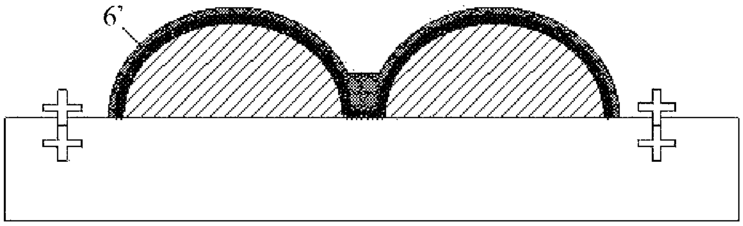
FIG. 6*d* is a schematic diagram of a structure of the microlens array substrate according to an embodiment of the present disclosure after forming a light shielding film.

(4) Forming a light shielding film. Forming the light shielding film includes: on the base 1 forming with the above structure, forming a light shielding film 6' on a side of the barrier layer 5 away from the base 1. The light shielding film 6' covers a plurality of microlenses 4 and a spacer portion 7 positioned between adjacent microlenses 4, as shown in FIG. 6*d*.

Figure 6E:
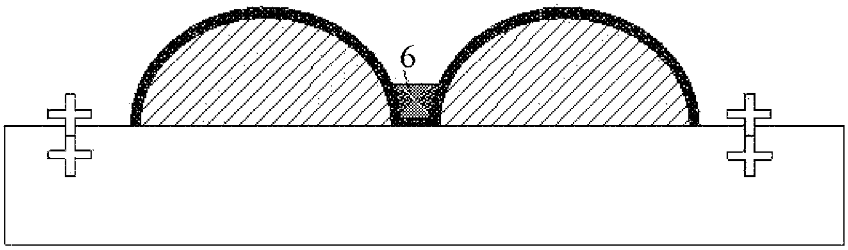
FIG. 6*e* is a schematic diagram of a structure of the microlens array substrate according to an embodiment of the present disclosure after forming a light shielding layer.

(5) Forming a light shielding layer. Forming the light shielding layer includes: on the base 1 forming with the above structure, performing a patterning process on the light shielding film 6', so that the light shielding film 6' forms at least one light shielding pattern 6, an orthographic projection of a light shielding pattern 6 on the base 1 being overlapped with an orthographic projection of a spacer portion 7 on the base 1, as shown in FIG. 6*e*.

A "patterning process" mentioned in the embodiment includes film layer deposition, photoresist coating, mask exposure, development, etching, photoresist stripping, and other treatments, and is a mature preparation process in related technologies. The deposition may be a known process such as sputtering and chemical vapor deposition, the coating may be a known coating process, and the etching may be a known approach, which are not specifically limited here.

Figure 6F:
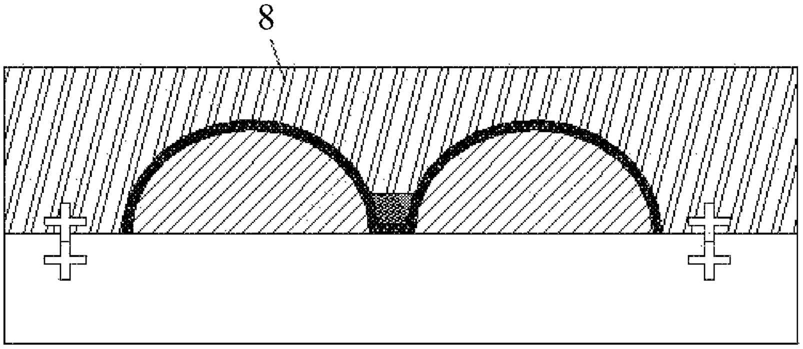
FIG. 6*f* is a schematic diagram of a structure of the microlens array substrate according to an embodiment of the present disclosure after forming a planarization layer.

(6) Forming a planarization layer. Forming a planarization layer includes: on the base 1 forming with the above structure, forming a planarization layer 8 on a side of the barrier layer 5 and the light shielding layer away from the base 1, as shown in FIG. 6*f*.

An embodiment of the present disclosure further provides a display device. The display device includes the microlens array substrate according to any one of embodiments described above. The display device can be a mobile phone, a tablet computer, a wearable smart product (such as a smart watch, a bracelet, or the like), a personal digital assistant (PDA), a vehicle-mounted computer, or the like. An embodiment of the present disclosure does not specially limit a specific form of the above foldable display device.

Figure 6G:
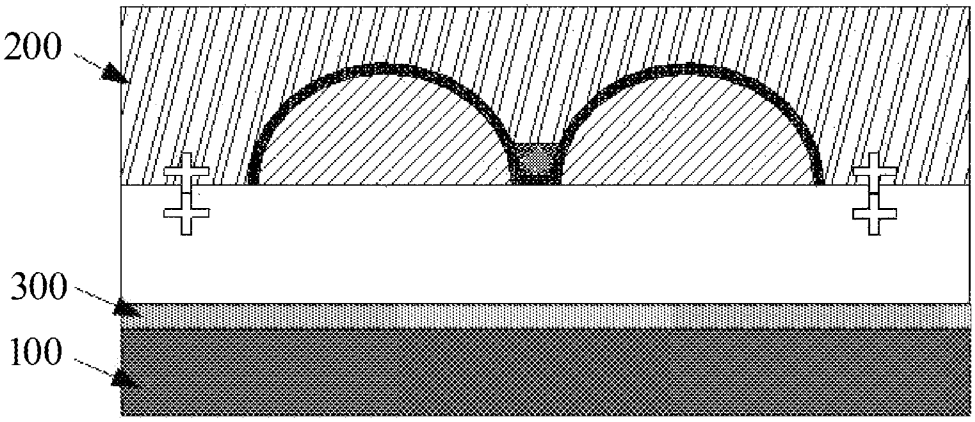
FIG. 6*g* is a schematic diagram of a structure of a display device of the present disclosure.

FIG. 6*g* is a schematic diagram of a structure of a display device of the present disclosure. In an exemplary implementation mode, as shown in FIG. 6*g*, the display device includes a display panel 100 and a microlens array substrate 200 oppositely disposed and an adhesive layer 300 positioned between the display panel 100 and the microlens array substrate 200. The adhesive layer 300 is used to realize the assembly of the display panel 100 and the microlens array substrate 200. OCA (Optionally Clear Adhesive) can be selected for the adhesive layer 300. OCA has the characteristics such as colorless transparency, light transmittance over 90%, good cementing strength, curing at room temperature or medium temperature, and small curing shrinkage.

The drawings of the present disclosure only involve structures involved in the present disclosure, and other structures may refer to conventional designs. The embodiments of the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the essence and scope of the technical solutions of the present disclosure, and shall all fall within the scope of the claims of the present disclosure.

Although implementation modes disclosed in the present disclosure are described as above, the described contents are only implementation modes which are used for facilitating understanding of the present disclosure, but are not intended to limit the present disclosure. Any skilled person in the art to which the present disclosure pertains may make any modification and variation in a form and details of implementation without departing from the spirit and scope of the present disclosure. However, the patent protection scope of the present disclosure should be subject to the scope defined in the appended claims.

The invention claimed is:

1. A microlens array substrate comprising:

a base;

a microlens film layer disposed on a side of the base and comprising at least one microlens array, wherein the microlens array comprises a plurality of microlenses and a spacer portion between adjacent microlenses;

a barrier layer disposed on a side of the microlens film layer away from the base, wherein an orthographic projection of at least part of the barrier layer on the base is overlapped with an orthographic projection of the microlenses on the base;

a light shielding layer disposed on a side of the microlens film layer away from the base and comprising at least one light shielding pattern, wherein an orthographic projection of the at least one light shielding pattern on the base is overlapped with an orthographic projection of the spacer portion on the base;

wherein the barrier layer comprises a first portion, an orthographic projection of the first portion on the base is overlapped with the orthographic projection of the microlenses on the base, an orthographic projection of at least part of the light shielding pattern on the base is overlapped with the orthographic projection of the microlenses on the base, and at least part of the light shielding pattern is disposed on a side of the first portion away from the base and in contact with the first portion.

2. The microlens array substrate according to claim 1, wherein the orthographic projection of the light shielding pattern on the base is completely overlapped with the orthographic projection of the spacer portion on the base.

3. The microlens array substrate according to claim 2, wherein the microlens film layer further comprises a first alignment mark, and an orthographic projection of the first alignment mark on the base is not overlapped with the orthographic projection of the microlenses on the base, and wherein the base comprises a second alignment mark, and an orthographic projection of at least part of the first alignment mark on the base is overlapped with the second alignment mark.

4. The microlens array substrate according to claim 2, further comprising a planarization layer disposed on a side of the barrier layer and the light shielding layer away from the base, wherein a refractive index of the planarization layer is lower than a refractive index of the microlenses.

5. The microlens array substrate according to claim 2, wherein a microlens is in a strip shape, the microlens extends along a first direction, and the plurality of microlenses are arranged along a second direction, a length of the microlenses in the second direction being from 10 microns to 300 microns; and/or, an arch height of the microlens is from 5 microns to 30 microns; and/or, a length of the spacer portion in the second direction is from 1.5 microns to 5 microns.

6. The microlens array substrate according to claim 2, wherein the barrier layer is made of an inorganic light-transmitting material.

7. The microlens array substrate according to claim 2, wherein the barrier layer has a thickness of 10 nm to 100 nm.

8. The microlens array substrate according to claim 1, wherein the orthographic projection of the spacer portion on the base is positioned in the orthographic projection of the light shielding pattern on the base, and an area of the orthographic projection of the spacer portion on the base is smaller than an area of the orthographic projection of the light shielding pattern on the base.

9. The microlens array substrate according to claim 1, wherein the barrier layer further comprises a second portion, an orthographic projection of the second portion on the base is overlapped with the orthographic projection of the spacer portion on the base, and at least part of the light shielding pattern is disposed on a side of the second portion away from the base and in contact with the second portion.

10. The microlens array substrate according to claim 9, wherein the first portion and the second portion are integrally formed.

11. The microlens array substrate according to claim 1, wherein the microlens film layer further comprises a first alignment mark, and an orthographic projection of the first alignment mark on the base is not overlapped with the orthographic projection of the microlenses on the base, and wherein the base comprises a second alignment mark, and an orthographic projection of at least part of the first alignment mark on the base is overlapped with the second alignment mark.

12. The microlens array substrate according to claim 1, further comprising a planarization layer disposed on a side of the barrier layer and the light shielding layer away from the base, wherein a refractive index of the planarization layer is lower than a refractive index of the microlenses.

13. The microlens array substrate according to claim 12, wherein the difference between the refractive index of the microlenses and the refractive index of the planarization layer is not less than 0.1.

14. The microlens array substrate according to claim 1, wherein a microlens is in a strip shape, the microlens extends along a first direction, and the plurality of microlenses are arranged along a second direction, a length of the microlenses in the second direction being from 10 microns to 300 microns; and/or, an arch height of the microlens is from 5 microns to 30 microns; and/or, a length of the spacer portion in the second direction is from 1.5 microns to 5 microns.

15. The microlens array substrate according to claim 1, wherein the barrier layer is made of an inorganic light-transmitting material.

16. The microlens array substrate according to claim 1, wherein the barrier layer has a thickness of 10 nm to 100 nm.

17. The microlens array substrate according to claim 1, wherein a maximum thickness of the light shielding pattern is from 1 micron to 5 microns.

18. A display device, comprising the microlens array substrate according to claim 1.

19. A preparation method for a microlens array substrate comprising:

forming a microlens film layer on a base, wherein the microlens film layer comprises a plurality of microlenses and a spacer portion positioned between adjacent microlenses;

forming a barrier layer on a side of the microlens film layer away from the base, wherein an orthographic projection of at least part of the barrier layer on the base is overlapped with an orthographic projection of the microlenses on the base; and forming a light shielding film on a side of the barrier layer away from the base, and performing a patterning process on the light shielding film, so that the light shielding film forms at least one light shielding pattern, wherein an orthographic projection of the at least one light shielding pattern on the base is overlapped with an orthographic projection of the spacer portion on the base;

wherein the barrier layer comprises a first portion, an orthographic projection of the first portion on the base is overlapped with the orthographic projection of the microlenses on the base, an orthographic projection of at least part of the light shielding pattern on the base is overlapped with the orthographic projection of the microlenses on the base, and at least part of the light shielding pattern is disposed on a side of the first portion away from the base and in contact with the first portion.

* * * * *